United States Patent
Ross, Jr.

(10) Patent No.: US 6,497,145 B1
(45) Date of Patent: Dec. 24, 2002

(54) FLOAT GAUGE WITH FIXED LIQUID LEVEL GAUGE

(75) Inventor: Herbert G. Ross, Jr., Argyle, TX (US)

(73) Assignee: Rochester Gauges, Inc., Dallas, TX (US)

( * ) Notice: Subject to any disclaimer, the term of this patent is extended or adjusted under 35 U.S.C. 154(b) by 0 days.

(21) Appl. No.: 09/335,104

(22) Filed: Jun. 17, 1999

(51) Int. Cl.[7] .................... G01F 23/30; G01F 23/00; G01F 23/56; G01F 23/32; G01F 23/36

(52) U.S. Cl. .................... 73/305; 73/290 R; 73/313; 73/317; 73/314

(58) Field of Search ............... 73/313, 317, 305, 73/319, 314

(56) References Cited

U.S. PATENT DOCUMENTS

| | | | |
|---|---|---|---|
| 2,500,348 A | 3/1950 | de Giers et al. | 73/313 |
| 2,992,560 A | 7/1961 | Morgan et al. | 73/317 |
| 3,463,843 A | 8/1969 | Taylor et al. | 264/68 |
| 3,688,795 A | 9/1972 | Taylor | 137/558 |
| 3,703,246 A | 11/1972 | Horak | 222/17 |
| 3,710,612 A | 1/1973 | Innes et al. | 73/1 R |
| 4,102,191 A | 7/1978 | Harris | 73/313 |
| 4,480,469 A | 11/1984 | Tice | 73/308 |
| 4,483,367 A | 11/1984 | Ross, Jr. et al. | 137/416 |
| 4,507,961 A * | 4/1985 | Stradella | 73/317 |
| 4,580,450 A | 4/1986 | Ota et al. | 73/313 |
| 4,605,038 A | 8/1986 | Tchitdjian | 137/399 |
| 4,610,165 A | 9/1986 | Duffy et al. | 73/317 |
| 4,635,480 A | 1/1987 | Hrncir et al. | 73/322.5 |
| 4,796,469 A | 1/1989 | Brown et al. | 73/49.2 |
| 4,939,932 A | 7/1990 | Ritzenthaler et al. | 73/317 |
| 4,991,436 A | 2/1991 | Roling | 73/320 |
| 5,027,871 A | 7/1991 | Guenther | 141/198 |
| 5,072,618 A | 12/1991 | Taylor et al. | 73/317 |
| 5,092,230 A | 3/1992 | Bronnert | 99/453 |
| 5,294,917 A | 3/1994 | Wilkins | 340/625 |
| 5,305,639 A * | 4/1994 | Pontefract | 73/317 |
| 5,357,815 A | 10/1994 | Williamson | 73/866.3 |
| 5,701,932 A * | 12/1997 | Bourscheid et al. | 137/558 |

OTHER PUBLICATIONS

Rochester Gauges, Inc., Magnetic Liquid–level Gauges for LP–Gas Service, 7200 Series, Technical Data Sheet, 2 pages (May, 1992).

Theodore C. Lemoff, P.E. (Editor), "Liquefied Petroleum Gases Handbook", Based on 1995 edition of NFPA 58, Standard for the Storage and Handling of Liquefied Petroleum Gases, Fourth Edition, 9 pages (1995).

Rochester Gauges, Inc., Industrial Liquid Level Gauges, Specifications Brochure (12 pages) (undated).

* cited by examiner

*Primary Examiner*—Hezron Williams
*Assistant Examiner*—Dennis Loo
(74) *Attorney, Agent, or Firm*—Sidley Austin Brown & Wood LLP

(57) ABSTRACT

A head for use in a combination float and maximum liquid level gauge. The head has a receptacle for receiving the support member of a float gauge and contains a passageway one end of which is positioned so that it will be exposed to the interior of a LP gas vessel and the other end of a passageway is external of the LP gas container. The exterior end is closed by a valve. The head may be used in conjunction with a dip tube, a float gauge, or a float gauge which has been modified to function as a dip tube to provide a combination fixed liquid level and float gauge.

27 Claims, 3 Drawing Sheets

FLOAT GAUGE WITH FIXED LIQUID LEVEL GAUGE

TECHNICAL FIELD OF THE INVENTION

The present invention relates to the gauges and in particular gauges for measuring the liquid level of liquefied petroleum gases.

BACKGROUND OF THE INVENTION

As used herein, liquefied petroleum gas (LP gas) refers to either the liquid or vapor state. LP gas is pressurized and stored in a pressure container. The more specific terms of "liquid LP gas" will refer to the pressurized gases in the liquid state and the term "vapor LP gas" will refer to the vapor phase of such gases. Because the volume of the liquefied gas varies with atmospheric temperature, it is important that the volume of the liquefied gas not be equal to the volume of the storage container otherwise there is a risk of bursting the storage container. Thus a filled container represents a maximum safe volume of liquid LP gas over which is a pressurized vapor LP gas. The liquid level of the liquid LP gas is measured typically by a float gauge. The level of liquid LP gas in the container can also be measured with a fixed liquid level gauge. A fixed liquid level gauge uses a dip tube and a relatively small positive shutoff valve and is designed to indicate when the liquid level in the container being filled reaches a point at which the dip tube communicates with the interior of the container. More typically a fixed maximum liquid level gauge is employed which it is set by proper dip tube length to the liquid level at which a container is filled to its maximum permitted filling limit under applicable safety guidelines. The fixed liquid level gauge allows pressurized vapor LP gas to be expelled through the gauge while the liquid level is below the dip tube as the tank is being filled. When the liquid level reaches the lower end of the dip tube, liquid begins to be expelled from the gauge, and the condensation of water vapor in the air can be seen enunciating that liquid has risen to the height indicated by the fixed liquid gauge.

Float gauges typically are constructed such that a float is positioned inside the container which rests on the liquid surface and the position of the float is transmitted through a lever mechanism and linkages to a pointer and dial outside the container. The motion of the float is conveyed to the gauge typically by magnetic linkage through a non-magnetic plate so that no LP gas is released to the atmosphere. The filling operation and the limit of fill is controlled by the weight of liquid LP gas or some prefer to utilize the fixed maximum liquid level gauge in order to ensure that the maximum safe permissible volume is not exceeded when the container is filled. Employment of both a float actuated contents gauge or the fixed liquid level gauge in the past required two openings in the container. There has been a need to minimize the number of openings required in a container and to simplify design and manufacturing costs, the present invention has the advantages requiring only one opening in the container for both gauges, simplifies construction and reduces the number of parts required while still providing both a float contents gauge and a fixed maximum liquid level gauge.

SUMMARY OF THE INVENTION

One object of the invention is to provide a gauge head configured to serve both as a head for a float gauge and for a fixed liquid level gauge. In one aspect, the invention is a body having a top and bottom with a passageway passing through the body having a first end and a second end and the body defines a receptacle to receive the end of a float support member. In the preferred embodiment the first end of said passageway is adapted to receive a dip tube for the maximum liquid level gauge and a valve is positioned at the second end of said passageway. In a preferred embodiment the body also includes a recess on the top surface to receive a dial assembly adapted to magnetically link with the magnet on a float arm assembly. In the preferred embodiment, the gauge is designed to be mounted on the top of the pressure vessel.

Another object of the invention is to provide for a simplified construction in which a separate dip tube for the maximum liquid level gauge is not required. In this embodiment, the invention has a gauge head for a float and fixed liquid level gauge comprising of body having a top and bottom, the body defines a receptacle for receiving a float support member of a float arm assembly and also defines a passageway having a first and second end, said first end communicating with the receptacle for the tubular member of the float arm assembly. The second end of the passageway is adapted to receive a valve.

In another aspect, the present invention is a combined float and fixed maximum liquid level gauge head comprising a body having a top and bottom and defining a receptacle for the float support and defining a passageway having a first and second end said first end communicating with the receptacle for the float support member and said second end adapted to receive a valve. The float support member defines a passageway and when attached to the receptacle extends from the bottom of the head, said support member's passageway communicates with the passageway in said head to form an extended passageway by joining the passageways. In another embodiment the support member is the length of a maximum filled dip tube. In another embodiment the support member is supplied with an orifice at a distance from the head where a maximum filled dip tube would be.

In another aspect, the present invention relates to a complete gauge having both a fixed liquid level and float gauge. The gauge is formed from one of the heads described above with the attachment of a dip tube and float gauge components having a top and bottom with a bushing at the top and a bushing at the bottom to hold rotatably a shaft having a magnet there. The shaft has a top and bottom. The top being equipped with a magnet and the bottom with a gear to engage a gear assembly attached to the float arm.

Movement of the float causes the float arm to move, rotating the shaft and the attached magnet. The magnet on the shaft is magnetically linked with a magnet in the dial assembly. Rotation of the magnet on the shaft rotates the magnets in the dial assembly causing the pointer to move.

BRIEF DESCRIPTION OF THE DRAWINGS

Further objects and advantages of the invention will become more apparent from the following description in claims and from the accompanying drawings wherein:

DETAILED DESCRIPTION OF THE INVENTION

Figure 1:
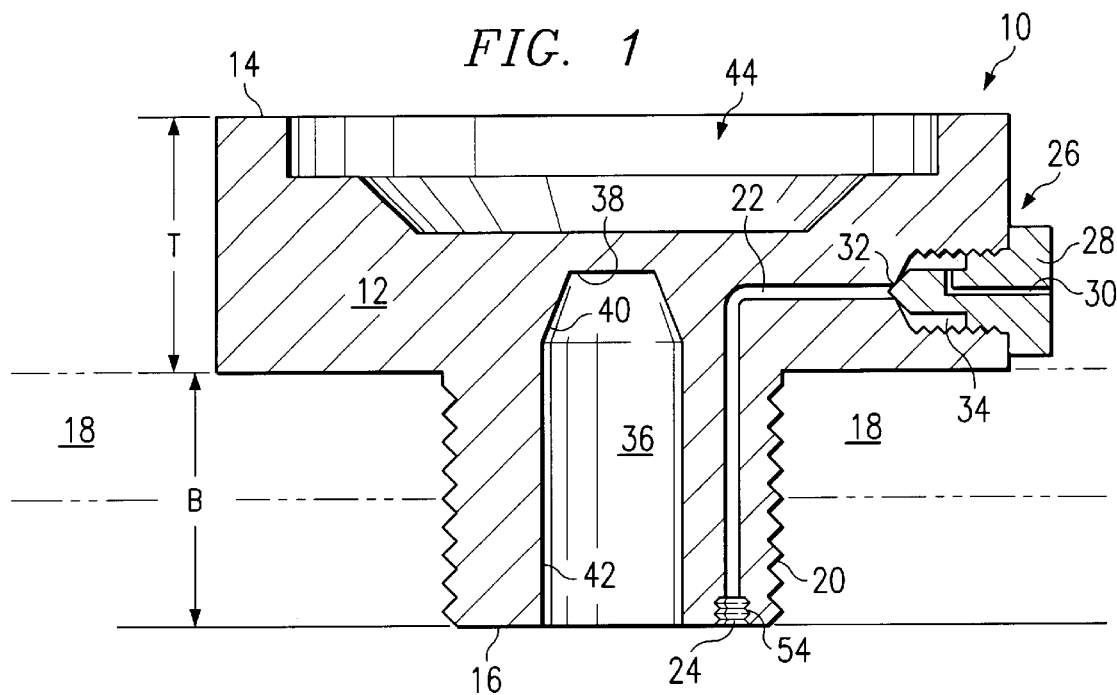
FIG. 1 is a cross sectional view of one embodiment head of the present invention.
Figure 2:
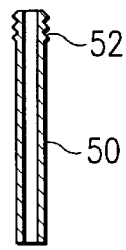
FIG. 2 is a cross sectional view of a dip tube to be attached to the apparatus of FIG. 1.

With reference now to the figures, and in particular to FIG. 1 a head 10 useful for a combination float and fixed liquid level gauge is shown. Head 10 is formed by a body 12 which has a top 14 and a top portion generally indicated by T and a bottom 16 and a bottom portion generally indicated by B. In the illustrated embodiment the head 10 is shown attached to a vessel 18 shown in phantom. The top portion of the gauge refers to that portion which extends outside of the vessel and the bottom portion is that portion which engages the vessel and which may extend into the vessel as illustrated. In the illustrated embodiment, the bottom surface has threads 20 to engage corresponding threads on the vessel 18. Other means to attach the gauge to the vessel may be used. The body 12 defines a passageway 22 which has a first end 24 and a second end 26. The first end 24 is used to communicate with the vessel through the bottom of the body and the second end 26 extends to the outside of the vessel. As illustrated in the FIG. 1, a valve 28 is located at the second end 26 of the passageway 22. Any suitable valve may be used, however, as illustrated a needle valve 28 can be employed. The needle valve 28 comprises a threaded plug with a valve passageway 30 therethrough and has a tip 32 which engages a reduced diameter portion of the passageway 22 to close the passageway 22. When the valve 28 is fully screwed in the tip 32 seals the passageway 22 preventing the escape of LP gas. The valve 28 is opened by turning the valve such that the seal by the tip 32 and mating surface is broken and hereby allows LP gas to fill the space 34 between the valve tip 32 and the passageway 22 allowing LP gas to escape through valve passageway 30. The body 12 also defines a receptacle 36 for receiving float support member (not shown in FIG. 1). In the illustrated embodiment the receptacle 36 is a cylindrical opening which at its closed end 38 has a tapering surface 40 reducing the diameter of the opening 42. The float support member may be press fitted into the opening. Other means of attaching the float support member to the head 10 such as threads can be utilized. However, press fitting has been found to be durable, easy to manufacture and economical. In a preferred embodiment, the top surface also defines a dial recess assembly 44. Recess 44 allows for the proper orientation of the dial assembly with the other components of the gauge. In this embodiment, the length of the bottom portion which extends into the tank may be predetermined length of a fixed maximum liquid level gauge. Alternatively, as shown in FIG. 2 a dip tube 50 may be attached to the head 10 by any suitable means such as threads 52 or by pressed fitting. In the illustrated embodiment the dip tube 50 can be screwed into threads 54 at the first end 24 of passageway 22. This is a preferred construction because the length of dip tube 50 can be changed for different styles and sizes of vessels as is known in the art to provide a fixed maximum level gauge for a variety of vessels while using the same head 10.

Figure 3:
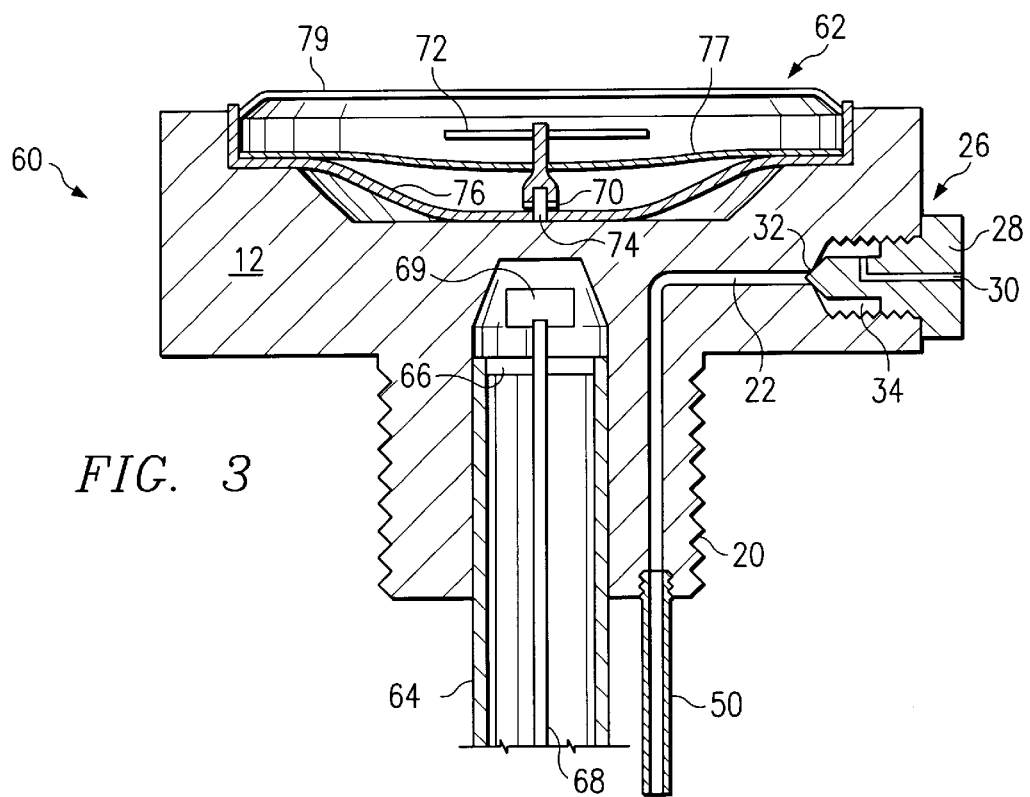
FIG. 3 is a partial cross sectional view of the head, of figure to be used to produce another embodiment of the invention.

FIG. 3 is a partial cross sectional view of a combination gauge 60 using body 12, having dip tube 50 attached, a dial assembly 62 located in recess 44, and a float support member 64 positioned in receptacle 36. Like numbers in the drawings refer to like items.

Figure 4:
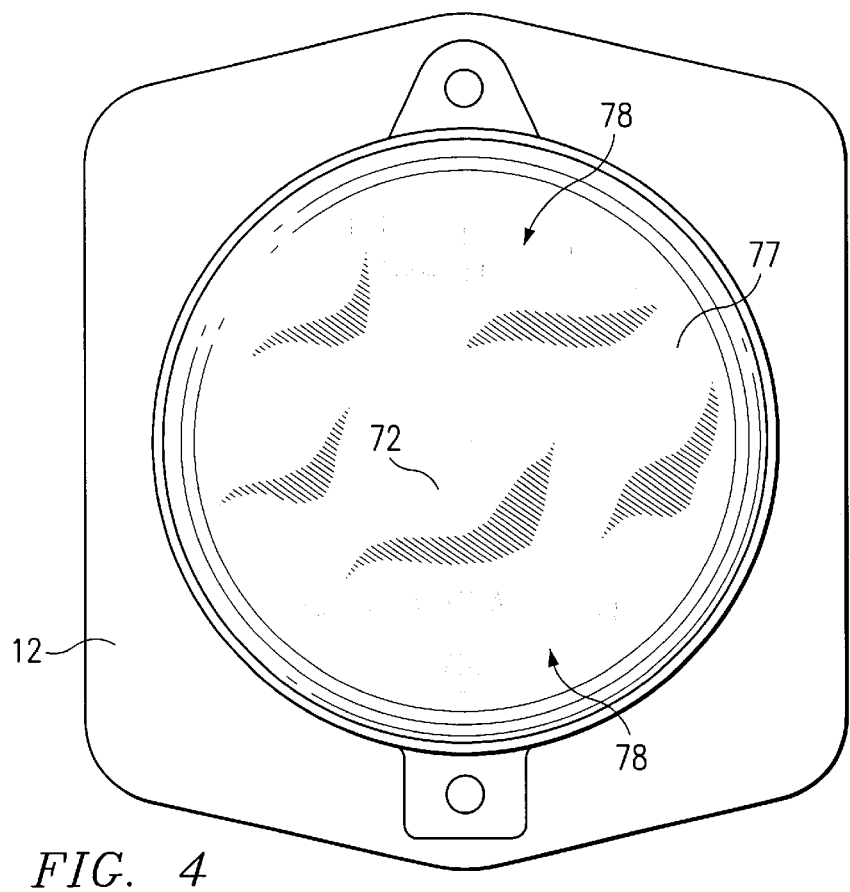
FIG. 4 is a top view of the dial assembly.

The float support member 62 has a bushing 66 which holds shaft 68 in place such that it may rotate. Shaft 68 is linked to the float, now shown. The end of the shaft 68 carries a magnet 69. Magnet 69 in combination with magnet 70 in the dial assembly magnetically couples the movement of shaft 68 with the dial pointer 72. The pointer 72 is pivotally mounted in pivot pin 74 extending from the base 76 of the dial assembly 62. The pointer 72 moves over dial face 77 which has indicia 78 as shown in FIG. 4 indicating fluid level.

A fixed maximum liquid gauge indicates a liquid level at which the vessel is filled to its maximum permitted limit. In operation of these maximum level gauges, the valve is opened while the vessel is being filled. The discharge from the maximum liquid level gauge at the valve is invisible if vapor LP gas is being emitted. As a level of the liquid LP gas reaches the bottom of the dip tube the discharge from the valve fogs by the condensation of water vapor in the air created by refrigeration when the vaporizing liquid is discharged through the valve. The length of the dip tube is determined by means and methods known in the art. The length of the dip tube may vary depending upon the type of gas, the volume of the vessel and the configuration of the container. When a fog is created by the discharge from the maximum liquid level gauge, the operator knows to discontinue filling of the vessel.

In another embodiment of the present invention, the need for a dip tube or to have the body extend into the tank the length of a dip tube is eliminated by using the float support member, in a manner in which it functions as the dip tube as described below.

Figure 5:
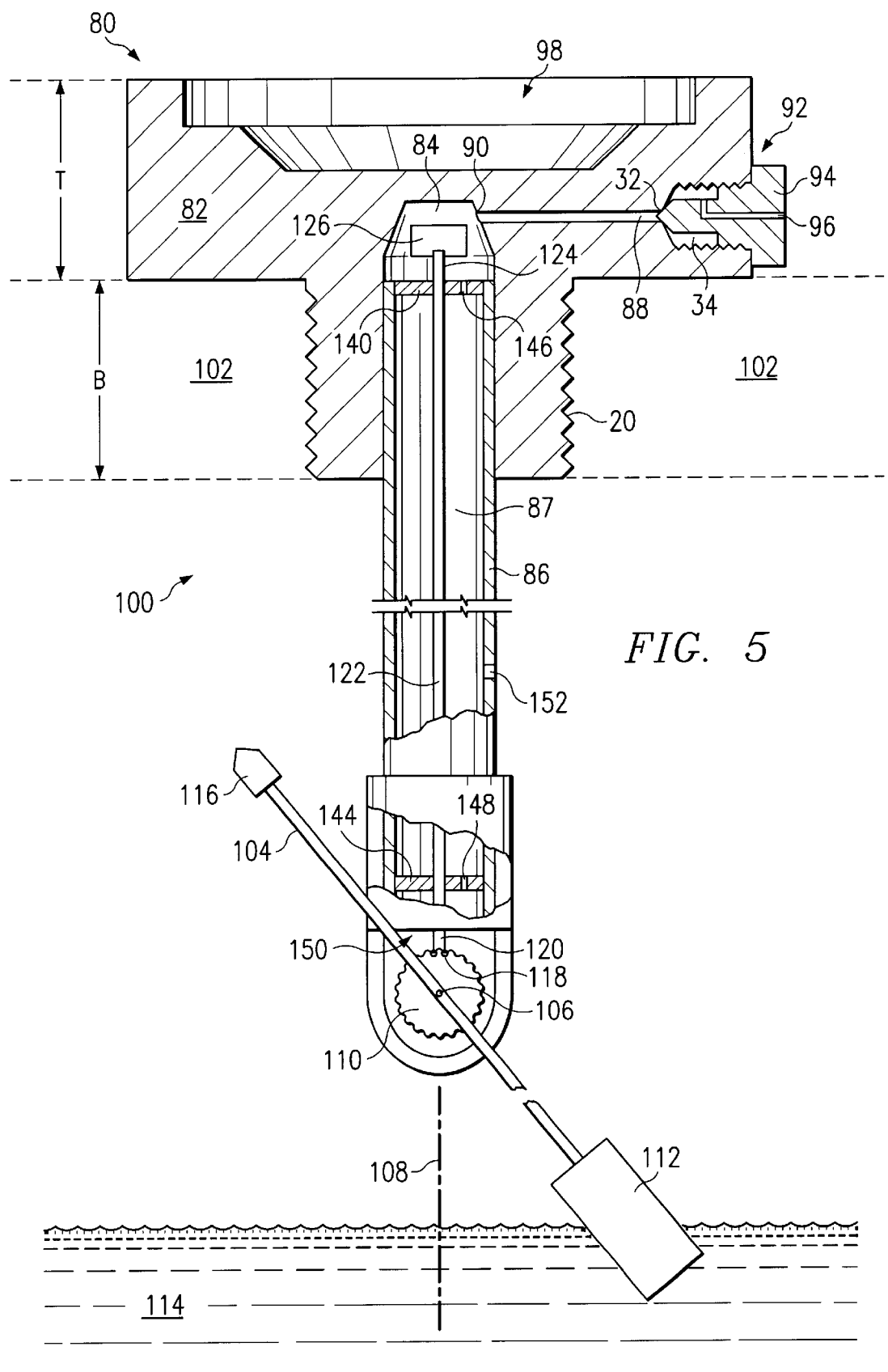
FIG. 5 is another embodiment of the present invention in partial cross section.

FIG. 5 shows a head 80 comprised of a body 82 having a top portion T and a bottom portion B and defining a receptacle 84 for a float support member 86. The support member 86 can be of any particular useful shape however a tubular member is preferred. The body 82 also defines a passageway 88 having a first end 90 and second end 92. The first end 90 communicates with the receptacle 84 for the support member 86 and the second end 92 communicates with the outer surface of the top portion of the body 82. As in the other embodiment, the second end 92 of the passageway 88 has a valve 94 attached thereto. The valve 94 can be of any suitable construction such as the needle valve 28 described with reference to FIGS. 5 and 1. The valve 94 is a nut having a passageway 96 and operated in the manner as described about in reference to FIGS. 1–3. In the preferred embodiment, the body 82 also includes a recess 98 for a proper placement of the dial assembly (not shown). The support member 86 defines a passageway 87.

The float assembly structured 100 includes a support member 86 that extends from the head 82 and into the vessel 102 shown in phantom. An arm 104 is mounted at a pivot 106 along its length for a pivotal motion about axis 108. A gear 110 is mounted on the arm 104 for movement with the arm 104. The first end of the arm 104 mounts a float 112 which is so configured to float at the surface 114 of the liquid in the vessel. A counter weight 116 can be mounted at the opposite end of the arm 104. The gear 110 meshes with gear 118 mounted on the bottom end 120 of a shaft 122 extending within support member 86 attached to the head 82. Shaft 122 can be rotatably held by bushings 140 and 144 or other suitable structures at the top and bottom of support member 86 such that shaft 122 may rotate. Within the recess 98 of the head a dial assembly can be mounted (not shown). The end top 124 of shaft 86 carries a magnet 126 which is positioned proximate to the dial assembly. In operation the pivot arm 104 pivots about axis 108 as float 112 follows the level 114 of the fluid. The pivotal motion of the arm 104 causes gear 110 to rotate gear 118 and thereby causing shaft 122 to rotate magnet 126 about an axis 108. Magnet 126 serves as a coupler to transmit movement of the float 112 to the dial assembly. For ease of reference, the dial assembly can operate in the same fashion as discussed above in reference to FIG. 3. The dial assembly 62 has a base 76 which is provided with pivot pin 74. The pointer 72 pivots or rotates about the axis of the pivot pin 74. On the bottom of the pointer 72 is a magnet 70. The magnet 70 is secured to the pointer 72 and serves as a coupler by interacting with magnet 126 so that the position the pointer 72 about the axis correlates directly with the position of float 112 and thus the surface 114 of the fluid.

The face plate 76, provides a surface which includes indicia 78 to give a read out of level of fluid in the vessel. A transparent cover 79 is provided on the top of the pointer assembly 62. Such pointer assemblies are well known in the art, and variations of such pointers are also well known in the art and can be utilized, further the pointer assembly can also be of the type that produces a digital readout.

The operation of the float gauge aspect of the combined gauge has been described. The operation of the fixed maximum liquid level gauge in this embodiment will now be described. Shaft 122 rotates within bushings 140 and 144. The space between the bushings and the shaft can allow the passage of LP gas between the shaft and the bushing. Also, if desired, orifices 146 and 148 may be provided in the bushings to facilitate passage of LP gas within the support member 86. Thus, the construction of the gauge allows the support member 86 to be utilized as the dip tube as well as the support member for the float mechanism. In one embodiment, the float support member 86 can be made of the length of an appropriate dip tube for the vessel in question. Thus, vapor LP gas can enter the open end of 150 of support 86 and flow into passageway 87, pass the bushings 144 and 140, flow into the first end 90 of the passageway 88 and then be discharged through passageway 96 of valve 94 when the valve 94 is opened. In the same manner, orifices 148 and 146 may be used to permit free flow of LP gas through passageway 87 of the support member 86. Thus, passageway 88 and the passageway of support 86 form the maximum liquid level gauge. As described up above, when the liquid reaches the opening 150 it will result in liquid LP gas exiting the valve and condensation at the valve will indicate the liquid has reached the maximum fill position. Alternatively, an aperture 152 can be provided in support member 86 which communicates with passageway 87. The aperture 152 is positioned along support member 86 at the length that a fixed dip tube would extend. When the aperture is placed above opening 150 the aperture will be placed at the location of the maximum fill level and the portion of the support 86 extending from the body to the aperture will serve as a dip tube. The condensate will not be admitted at valve 92 until the liquid LP gas level reaches aperture 152. This embodiment allows a single support member to be used for a number of different vessels because aperture 152 can be drilled in support 86 at a location corresponding to the maximum liquid level of different styles and sizes of vessels.

The head for the gauge is preferably made out of zinc or other non-magnetic materials so as not to interfere with a magnetic coupling of the float arm magnet with the dial assembly magnet. Other materials of construction as known in the art. Other materials as is known in the art may be employed.

While certain embodiments of the present invention have been illustrated in the drawings, and described in the foregoing detailed description, it will be understood that the invention is not limited to the embodiments disclosed, but is capable of numerous rearrangements, modifications and substitutions of parts and elements without departing from the scope and spirit of the invention.

I claim:

1. A head for a liquefied gas gauge comprising:
    a body having a top and a bottom, said body defining a passageway therethrough, said passageway having a first end and a second end, said body defining a receptacle capable of receiving an end of a float support member, said float support member adapted to substantially house a rod, said rod being rotatable about its longitudinal axis; and
    a valve detachably coupled to said body at said second end of said passageway.

2. The head of claim 1 further comprising a dip tube attached to said first end of said passageway and extending from the bottom of said body.

3. The head of claim 1 wherein said body also defines a recess on the top of the body for receiving a dial assembly.

4. The head of claim 3 further comprising a dip tube attached to said first end of said passageway and extending from the bottom of said body.

5. A head as claimed in claim 3 further comprising a magnetic element, said magnetic element attached at an end of said rod, said rod and said magnetic element adapted to rotate to effect a movement in an indicator of said dial assembly.

6. A head for a liquefied gas gauge comprising:
    a body having a top and a bottom, said body defining a receptacle capable of receiving an end of a float support member of a float assembly, said body defining a passageway having a first end and a second end, said first end of said passageway of said body communicating with said receptacle; and
    a valve detachably coupled to said body at said second end of said passageway of said body.

7. The head of claim 6 further comprising a float assembly comprising a float support member having a first end and a second end and defining a passageway, wherein the first end of said float support member extends from said receptacle and is positioned such that said passageway in the body communicates with said passageway in the float support member.

8. The head of claim 7 wherein said float support member defines an aperture a predetermined distance from the bottom of the body, said aperture passing through said float support member and communicating with said passageway in said float support member.

9. An apparatus as claimed in claim 6 further comprising a float assembly having a float support member which is adapted to substantially house a rod, said rod having a magnetic element attached at a first end of said rod, said rod and said magnetic element being rotatable about a longitudinal axis of said rod.

10. A head as claimed in claim 7 further comprising a dial assembly having a rotatable indicator.

11. An apparatus for measuring fluid level, comprising:
    (a) a body having a top and a bottom, said body defining a passageway therethrough having a first end and a second end, said body defining a receptacle for receiving an end of a float support member of a float assembly, said body having a valve threadedly coupled to said second end of said passageway;
    (b) a dip tube attached to sa:d first end of said passageway; and
    (c) a float assembly comprising
        a float support member hanging an end coupled to said receptacle,
        a rod, and a magnetic element attached at one end of said rod,
said float support member adapted to substantially house said rod, said rod and said magnetic element being rotatable about a longitudinal axis of said rod.

12. The apparatus of claim 11 further comprising a dial assembly mounted on said body.

13. An apparatus for measuring fluid level comprising:
(a) a body having a top and a bottom, said body defining a receptacle capable of receiving an end of a float support member of a float assembly, said body also defining a passageway having a first end and a second end, said first end communicating with said receptacle;
(b) a valve attached to said second end of said passageway; and
(c) a float assembly comprising:
 (i) a float support member having a first end and a second end, said first end coupled to said receptacle, said float support member defining a passageway;
 (ii) bushings at each of said first end and said second end of said float support member;
 (iii) a shaft having a first end and a second end, said shaft being rotatable in said bushings;
 (iv) a first gear attached to said second end of said shaft;
 (v) a magnetic element coupled to said first end of said shaft;
 (vi) a pivot arm having a float attached to it; and
 (vii) a second gear attached to said pivot arm, said first gear and said second gear each having teeth which are engaged so that rotation of one gear induces a corresponding rotation on the other gear.

14. The apparatus of claim 10 further comprising a dial assembly mounted on said body.

15. The apparatus of claim 13 wherein said float support member defines an aperture which allows for the communication of the passageway of said float support member with an interior of a LP gas containment vessel.

16. The apparatus of claim 13 wherein a length of said float support member is a predetermined length such that a predetermined portion of the passageway in the float support member is at a predetermined location within a vessel to provide a fixed liquid level gauge.

17. The apparatus of claim 15 wherein said aperture is positioned at a distance from the bottom of said body so as to provide a desired fixed liquid level gauge of a predetermined length.

18. The apparatus of claim 13 wherein said bushings also define orifices therethrough for the passage of liquid and gases.

19. An apparatus for measuring fluid level comprising:
(a) a body having a top and a bottom, said body defining a receptacle capable of receiving an end of a float support member, said body defining a passageway having a first end and a second end, said first end positioned so as to allow communication with an interior of a pressure vessel to which the device may be attached;
(b) a valve attached to said second end of said passageway;
(c) a float assembly comprising:
 (i) a float support member attached to said receptacle, said float support member defining a passageway;
 (ii) a shaft having a first end and a second end and rotatably mounted within the passageway of said float support member;
 (iii) a magnet attached to said first end of said shaft;
 (iv) a first engaging means attached to said second end of said shaft, said first engaging means adapted to engage a cooperating mechanism;
 (v) a pivot arm pivotally attached at said second end of said float support member, said arm having a float attached thereto; and
 (vi) a second engaging means attached to said pivot arm, said first and second engaging means positioned such that they cooperate such that movement of one induces a corresponding movement in the other, wherein movement of said first and second engaging means induces a rotation of said shaft.

20. The apparatus of claim 19 further comprising a dip tube coupled to said first end of said passageway in said body.

21. The apparatus of claim 13 wherein said passageway within said body is in fluid communication with the passageway in said float support member.

22. An apparatus as claimed in claim 19 further comprising a dial assembly having an indicator, wherein said rotation of said rod rotates said magnetic element and said rotation of said magnetic element affects a movement in said indicator of said dial assembly.

23. An apparatus as claimed in claim 19
wherein said valve is provided with a valve tip, a top, a side, and defining a passageway,
wherein said valve tip is adapted to seat within said second end of said passageway of said body, and
wherein said passageway of said valve is adapted to communicate with said passageway of said body when said valve tip is not fully seated within said second end of said passageway of said body.

24. A head as claimed in claim 10
wherein said float assembly further comprises a rod substantially housed in said float support member, and a magnetic element attached to an end of said rod, said rod and said magnet being rotatable about a longitudinal axis of said rod, and
wherein rotation of said magnet induces a corresponding rotation in said indicator of said dial assembly.

25. A head for a liquefied gas gauge comprising:
a body having a top and a bottom, said body defining a passageway therethrough, said passageway having a first end and a second end, said passageway having a predetermined length of a fixed liquid level gauge, said body also defining a receptacle capable of receiving an end of a float support member; and
a valve detachably coupled to said body at said second end of said passageway.

26. An apparatus for measuring fluid level, comprising:
(a) a body having a top and a bottom, said body defining a passageway therethrough having a first end and a second end, said body defining a receptacle for receiving an end of a float support member of a float assembly, said body having a valve coupled to said second end of said passageway;
(b) a dip tube having a predetermined length of a maximum liquid level gauge attached to said first end of said passageway; and
(c) a float assembly.

27. An apparatus for measuring fluid level comprising:
(a) a body having a top and a bottom, said body defining a receptacle capable of receiving an end of a float support member of a float assembly, said body also defining a passageway having a first end and a second end, said first end communicating with said receptacle;
(b) a valve attached to said second end of said passageway; and (c) a float assembly comprising:
  (i) a float support member having a first end and a second end, said first end coupled to said receptacle, said float support member defining a passageway having a predetermined length of a fixed liquid level gauge;
  (ii) bushings at each of said first end and said second end of said float support member;
  (iii) a shaft having a first end and a second end, said shaft being rotatable in said bushings;
  (iv) a first gear attached to said second end of said shaft;
  (v) a magnetic element coupled to said first end of said shaft;
  (vi) a pivot arm having a float attached to it; and
  (vii) a second gear attached to said pivot arm, said first gear and said second gear each having teeth which are engaged so that rotation of one gear induces a corresponding rotation on the other gear.

* * * * *

UNITED STATES PATENT AND TRADEMARK OFFICE
CERTIFICATE OF CORRECTION

PATENT NO. : 6,497,145 B1
DATED : December 24, 2002
INVENTOR(S) : Herbert G. Ross, Jr.

It is certified that error appears in the above-identified patent and that said Letters Patent is hereby corrected as shown below:

Column 5,
Lines 58-59, delete "assembly magnet. Other materials of construction as known in the art. Other materials as is known in the art may be employed.", and insert -- assembly magnet. Other materials of construction as known in the art may be employed.

Column 6,
Line 62, delete "sa:d", and insert -- said --.

Column 7,
Line 29, delete "10", and insert -- 13 --.

Signed and Sealed this

Twenty-third Day of March, 2004

JON W. DUDAS
*Acting Director of the United States Patent and Trademark Office*